United States Patent

[11] 3,554,094

| | | | |
|---|---|---|---|
| [72] | Inventor | George Gross | |
| | | Burbank, Calif. | |
| [21] | Appl. No. | 801,110 | |
| [22] | Filed | Feb. 20, 1969 | |
| [45] | Patented | Jan. 12, 1971 | |
| [73] | Assignee | Bell Aerospace Corporation | |
| | | a corporation of Delaware | |

[54] PISTON ROD LOCKING MECHANISM
6 Claims, 2 Drawing Figs.

[52] U.S. Cl. ............................................. 92/28,
188/67, 188/170
[51] Int. Cl. ............................................. F15b 15/26
[50] Field of Search ............................. 92/28, 27,
24; 9/23, 17, 15; 188/67, 170(Inquired); 74/531
(Inquired); 70/181(Inquired); 16/51, 52
(Inquired)

[56] References Cited
UNITED STATES PATENTS

| 566,130 | 8/1896 | Bowers | 74/531 |
|---|---|---|---|
| 2,673,624 | 3/1954 | Huber | 92/28X |
| 2,811,136 | 10/1957 | Westcott et al. | 92/27 |
| 2,859,919 | 11/1958 | Debrie | 188/67X |
| 2,996,321 | 8/1961 | Harris | 74/531X |
| 3,033,171 | 5/1962 | Engel Brechtera | 92/27X |
| 3,359,862 | 12/1967 | Modrich | 92/28X |

FOREIGN PATENTS

| 608,704 | 9/1948 | Great Britain | 92/27 |
|---|---|---|---|

*Primary Examiner*—Martin P. Schwadron
*Assistant Examiner*—Leslie J. Payne
*Attorney*—Nilsson, Robbins, Wills and Berliner

ABSTRACT: A piston rod locking mechanism in which a locking ring is formed with an eccentric bore for the rod. Means are provided for rotating the locking ring eccentrically with respect to the bore to thereby bind the rod against axial movement.

PATENTED JAN 12 1971

3,554,094

INVENTOR.
GEORGE GROSS
BY Nilsson & Robbins
Attorneys.

PISTON ROD LOCKING MECHANISM

BACKGROUND OF THE INVENTION

1. Field of the Invention

The field of art to which the invention pertains includes the field of fluid handling, particularly with respect to valve actuators and locks therefor.

2. Description of the Prior Art

It is often very desirable to abruptly lock a piston rod against further travel. For example, in a hydraulic system a sudden drop in hydraulic pressure may indicate a system failure requiring the immediate locking of the equipment to prevent damage, to enable a more accurate determination of the reasons for failure, or for a variety of other purposes. Various methods have been utilized in the past to provide such an "infinite" lock, particularly as safety devices on brakes. For example, in U.S. Pat. No. 2,873,579, a locking ring is provided on a brake piston rod and is canted in the direction of axial movement of the of the rod to thereby bind the rod. In U.S. Pat. No. 3,177,779, a brake-operating rod is provided with a wedge-shaped portion intermediate thereof engageable with an inclined plane to frictionally lock the rod. Split collar mechanisms are illustrated in U.S. Pat. Nos. 1,503,280 and 2,372,196. While each of the devices are useful for the purposes disclosed therefor, the space and load requirements of many hydraulic devices require a simpler and/or more effective mechanism.

SUMMARY OF THE INVENTION

The present invention provides a simple, effective and reliable "infinite" position lock for abruptly securing the axial position of a piston rod. Means are provided for supporting a piston rod for axial movement thereof, and a member is provided on the rod defining a close-fitting bore for axial movement of the rod therethrough. Means are provided for rotating the member eccentrically with respect to the bore to thereby bind the rod against axial movement. In particular, a locking ring is formed with an eccentric bore for the piston rod. Continuously effective spring means are provided for rotating the locking ring toward a first rotational position and means are provided operable to rotate the locking ring toward a second rotational position. The rotations are eccentric with respect to the bore to thereby bind the rod against axial movement. In a specific embodiment, a spring biases the locking ring to a locked position, but hydraulic pressure is provided against the spring freeing the locking ring. Upon failure of the hydraulic pressure, the force of the spring causes an abrupt, eccentric rotation of the locking ring to bind the piston against further axial movement.

DESCRIPTION OF THE PREFERRED EMBODIMENTS

Figure 1:
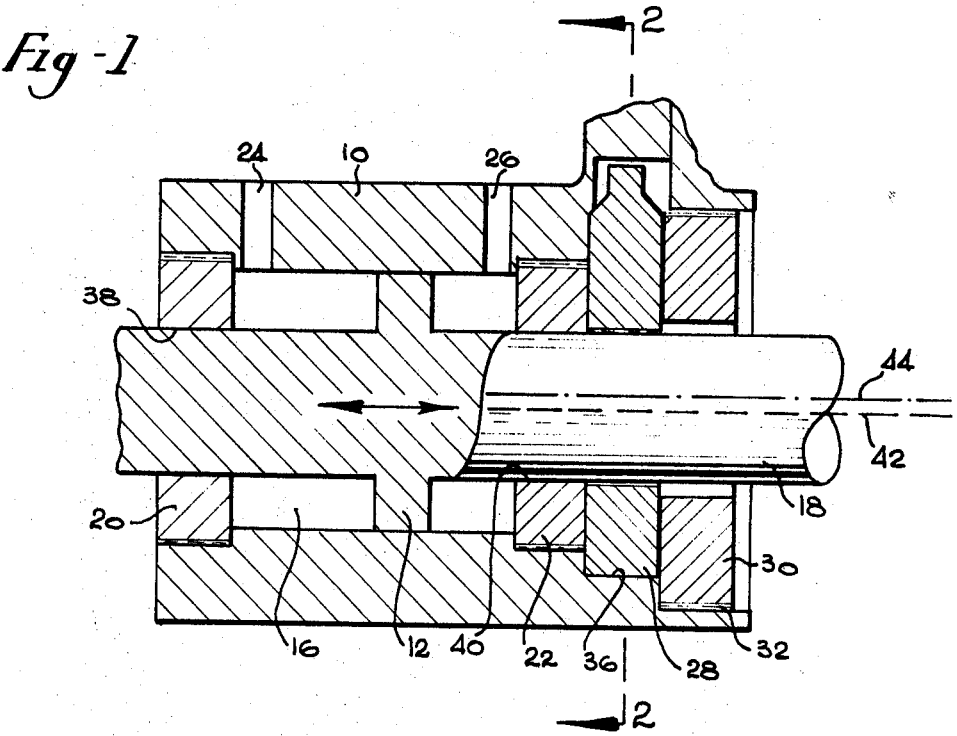
FIG. 1 is a fragmentary, sectional view of a piston rod locking mechanism of this invention.
Figure 2:
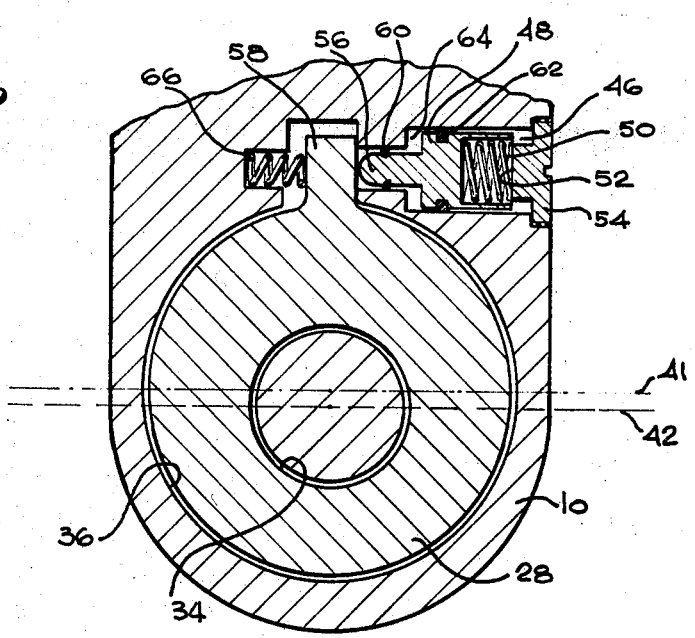
FIG. 2 is a cross-sectional view taken on the line 2-2 of FIG. 1, in the direction of the arrows.

Referring to both FIGS. 1 and 2, there is illustrated an actuator mechanism including a housing 10 and utilizing a piston 12 slidably positioned within the housing 10 and moveable longitudinally along its axis as indicated by the arrow 14 within a cylinder 16 defined by the housing 10. The piston 12 is formed with a piston rod 18 centrally thereof which extends through the cylinder 16 protruding externally thereof. Sealing glands 20 and 22 are provided at opposite ends of the cylinder, encircling the piston rod 18. Movement of the piston 12 is responsive to the application of hydraulic fluid or the like, to either side of the piston 12 via one or the other of ports 24 and 26 thereat defined by the housing 10, as is well-known.

A locking ring 28 is provided on one side of the cylinder 16, encircling the cylindrical piston rod 18 thereat, and is held in place against the gland 22 by a retainer ring 30 threaded, at 32, into the housing, but allowing rotational movement of the locking ring 28.

Referring specifically to FIG. 2, the locking ring 28 defines a bore 34 which is formed eccentrically with respect to the curvature of the outer surface 36 of the locking ring 28. The locking ring 28 is disposed in the housing 10 with its outer surface 36 eccentric with respect to the position within the cylinder 16 of the piston rod 18. The dimensions are such that, in an unlocked position, the bore 34 in the locking ring is aligned axially with the piston rod 18 and the piston rod bores 38 and 40 in the glands 20 and 22. The rotational eccentricity of the locking ring 28 with respect to the center of curvature of the locking ring and gland bores 34, 38 and 40 is shown by the offset positions of the piston 18 centerline (shown by dashed lines 42) and the locking ring 28 rotational center line (shown by the dash-dot line 44). The effect of such eccentricity, is that upon rotational movement of the locking ring 28, an immediate binding takes place against the piston rod 18 to abruptly stop its axial movement.

Rotational movement of the locking ring 28 can be initiated in any manner desired. With the embodiment illustrated herein, and with particular reference to FIG. 2, the housing 10 defines a chamber 46 enclosing a plunger 48 and spring 50 therefor. The spring 50 is chosen to have a size and spring moment appropriate to the load requirements of the device; the proportions shown in FIG. 2 are for illustration purposes only and are not to scale. A reaction surface 52 for the spring 50 is provided internally of a threaded member 54 that seals the chamber 46 thereat. The plunger 48 has an actuating button 56 extending through a reduced section of the chamber 46 to abut against a protrusion 58 from the locking ring 28. The actuating button 56 and plunger 48 are sealed within the chamber 46 by means of o-rings 60 and 62, respectively, to define a hydraulic pressure chamber 64 therebetween.

The pressure chamber 64 is provided with a port thereto (not shown) by means of which hydraulic pressure can be introduced to keep the spring 50 compressed and the actuating button 56 in a withdrawn position, as shown. A return spring 66 is provided on the opposite side of the protrusion 58 and has much less strength than the actuating spring 50, but sufficient to bias the locking ring 28 in an unlocked position in the absence of bias from the actuating spring 50.

In operation, if hydraulic pressure is inserted in the pressure chamber 64, the actuating spring 50 is kept compressed and the actuating button 56 is maintained withdrawn in the position shown. However, should the hydraulic pressure at 64 be lost for any reason, the actuating spring 50 immediately expands, pushing the actuating button 56 against the locking ring protrusion 58 causing the locking ring to be rotated eccentrically with respect to its bore 34. The result is an immediate binding of the piston rod 18 to lock the piston 12 in its position. The result is an efficient and effective fail-safe mechanism.

Although the foregoing mechanism was described as responding to a failure in hydraulic pressure, the mechanism can be designed to respond to an increase in hydraulic pressure, simply by directing the pressure within the chamber 46 on the opposite side of the plunger 48, rather than through the pressure chamber 64. In this case, the spring 66, described as a return spring, would function as a locking spring and would be chosen to exert a locking bias appropriate to the load.

I claim:

1. A piston rod locking mechanism, comprising:
    a piston rod;
    means for supporting said rod for axial movement thereof;
    a member on said rod defining a close-fitting bore for axial movement of said rod therethrough; and
    fluid-actuated means responsive to change in fluid pressure for rotating said member eccentrically with respect to said bore to thereby bind said rod against axial movement thereof.

2. The mechanism of claim 1, including means axially aligning said rod for linear movement thereof, and means defining a rotation surface for said member having a center of curvature offset from the center of curvature of said bore.

3. The mechanism of claim 1, wherein said member defines a rotation surface having a center of curvature offset with respect to the center of curvature of said bore therethrough, said rotating means defining a mating surface for said rotation surface for guiding rotation of said member.

4. The mechanism of claim 3, wherein said rotation surface is defined by the outer surface of said member.

5. The mechanism of claim 1, wherein said rotating means comprising a resiliently deformable member biasing said member in one rotational direction and means responsive to fluid pressure for movement of said member in an opposite rotational direction.

6. A piston rod locking mechanism, comprising:
   a piston rod;
   a locking ring formed with an eccentric bore for said piston rod;
   continuously effective spring means for rotating said ring toward a first rotational position;
   means operable to rotate said ring toward a second rotational position; and
   said rotations being eccentric with respect to said bore to thereby bind said rod against axial movement in one of said first and second rotational positions.